(12) United States Patent
Gailloux

(10) Patent No.: US 7,769,412 B1
(45) Date of Patent: Aug. 3, 2010

(54) WEARABLE WIRELESS TELECOMMUNICATIONS SYSTEMS

(75) Inventor: Michael Arthur Gailloux, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 543 days.

(21) Appl. No.: 11/406,959

(22) Filed: Apr. 19, 2006

(51) Int. Cl.
*H04M 1/00* (2006.01)

(52) U.S. Cl. ............ 455/569.1; 455/419; 455/420; 455/421

(58) Field of Classification Search ............ 455/419, 455/420, 421, 569.1
See application file for complete search history.

(56) References Cited

U.S. PATENT DOCUMENTS

| | | | |
|---|---|---|---|
| 5,912,653 A | 6/1999 | Fitch | |
| 5,929,777 A * | 7/1999 | Reynolds | 340/825.49 |
| 6,381,482 B1 * | 4/2002 | Jayaraman et al. | 600/388 |
| 6,714,233 B2 | 3/2004 | Chihara | |
| 6,757,719 B1 | 6/2004 | Lightman et al. | |
| 6,895,261 B1 * | 5/2005 | Palamides | 455/575.6 |
| 7,003,335 B2 * | 2/2006 | Briancon | 455/575.6 |
| 2002/0091843 A1 * | 7/2002 | Vaid | 709/230 |
| 2002/0156677 A1 | 10/2002 | Peters et al. | |
| 2002/0197960 A1 | 12/2002 | Lee | |
| 2004/0115430 A1 * | 6/2004 | Leonard | 428/364 |
| 2004/0192260 A1 * | 9/2004 | Sugimoto et al. | 455/412.1 |
| 2004/0192335 A1 * | 9/2004 | Wong et al. | 455/456.1 |
| 2005/0206616 A1 | 9/2005 | Harary | |
| 2005/0216346 A1 | 9/2005 | Kusumoto et al. | |
| 2007/0027673 A1 * | 2/2007 | Moberg | 704/9 |
| 2007/0060118 A1 * | 3/2007 | Guyette | 455/420 |
| 2007/0124721 A1 | 5/2007 | Cowing | |
| 2007/0216600 A1 | 9/2007 | Langlois | |

OTHER PUBLICATIONS

Rick Merritt, Darpa Kick Starts Wearable Computer Initiative, website http://www.eetimes.com/story/OEG20011101S0054, printed Feb. 16, 2006, 5 pages.

E.R. Post et al., E-Broidery: Design and Fabrication of Textile-Based Computing, IBM Systems Journal, 2000, pp. 840-860, vol. 39, Nos. 3&4.

When Style and Comfort are not Enough, Virginia Tech web article http://www.ecpe.vt.edu/news/ar04/hokie.html, Apr. 2004, 4 pages.

Carey Goldberg, Getting Wired Could Help Predict Emotions, The Boston Globe website http://www.boston.com/yourlife/health/mental/articles/2005/06/13/getting_wired_could_help_predict_emotions?mo..., Jun. 13, 2005, 3 pages.

(Continued)

*Primary Examiner*—Rafael Pérez-Gutiérrez
*Assistant Examiner*—Liton Miah

(57) ABSTRACT

A wearable wireless telecommunications system for providing wireless telecommunications capabilities to a wearer. The wearable wireless telecommunications system includes an interface device, a microphone, and a speaker, each of which may be integrated with a garment having e-textiles. The interface device includes a long-range wireless telecommunications component for communicating with a wireless telecommunications network. In addition, the interface device includes e-textile interfaces for interfacing with the e-textiles in the garment. At least one of the microphone and speaker are communicatively coupled with the interface device via the e-textiles in the garment.

18 Claims, 3 Drawing Sheets

OTHER PUBLICATIONS

D. Marculescu et al., Electronic Textiles: A Platform for Pervasive Computing, Proceedings of the IEEE, Dec. 2003, pp. 1993-2018, vol. 91, No. 12.

A New Way to Ride, SGMAG.com Gear website http://www.sgmag.com/hear/burton/, printed Feb. 16, 2006, 3 pages.

Randell, Cliff and Muller, Henk, "The Shopping Jacket: Wearable Computing for the Consumer", Personal Technologies (2000). pp. 4:241-244.

Office Action dated: Oct. 29, 2008 from U.S. Appl. No. 11/426,217, filed Jun. 23, 2006.

Office Action dated: Apr. 30, 2009 from U.S. Appl. No. 11/426,217, filed Jun. 23, 2006.

Office Action dated: Jul. 9, 2009 from U.S. Appl. No. 11/426,228, filed Jun. 23, 2006.

Office Action dated: Jan. 21, 2009 from U.S. Appl. No. 11/426,229, filed Jun. 23, 2006.

Office Action dated: Jun. 16, 2009 from U.S. Appl. No. 11/426,229, filed Jun. 23, 2006.

Office Action dated: Oct. 29, 2008 from U.S. Appl. No. 11/426,185, filed Jun. 23, 2006.

Leander Kahney, Video Clothes: 'Brand' New Idea, Wired News, Jun. 7, 2000, www.wired.com/news/technology/1,36698-0.html, Lycos, Inc.

France Telecom develops flexible display clothing, gizmag, www.gizmag.com/go/3043.

Nyx clothing offers built-in flexible display screens, gizmag, www.gizmag.com/go/3409.

Clayton Collins, 'Billboards' that walk, talk, and even flirt a little, The Christian Science Monitor, Jul. 8, 2004, www.csmonitor.com/2004/0708/p11s01-wmgn.html.

Office Action dated Oct. 5, 2009 from U.S. Appl. No. 11/426,217, 25 pages.

Final Office Action from U.S. Appl. No. 11/426,228 dated Feb. 3, 2010, 23 pages.

Notice of Allowance from U.S. Appl. No. 11/426,229 dated Jan. 8, 2010, 11 pages.

* cited by examiner

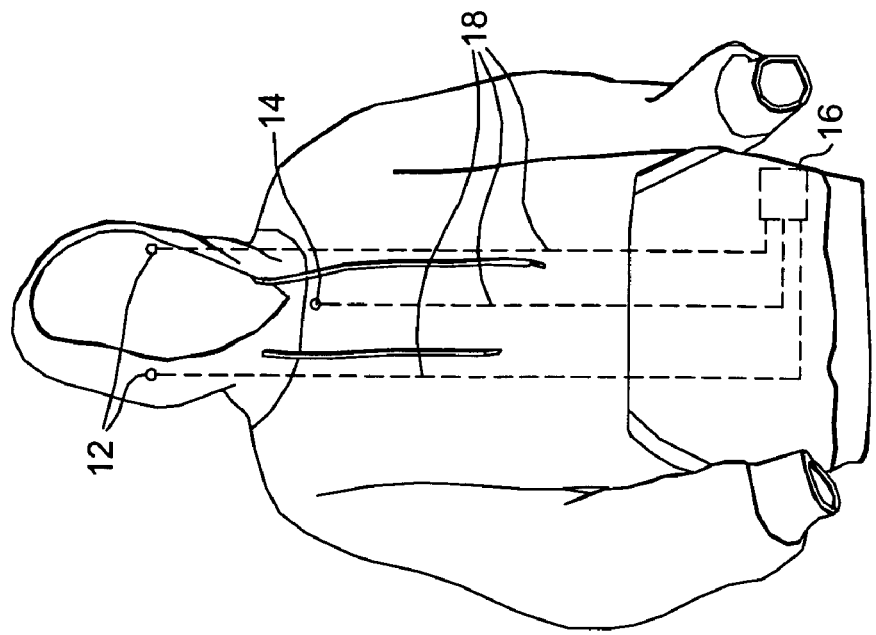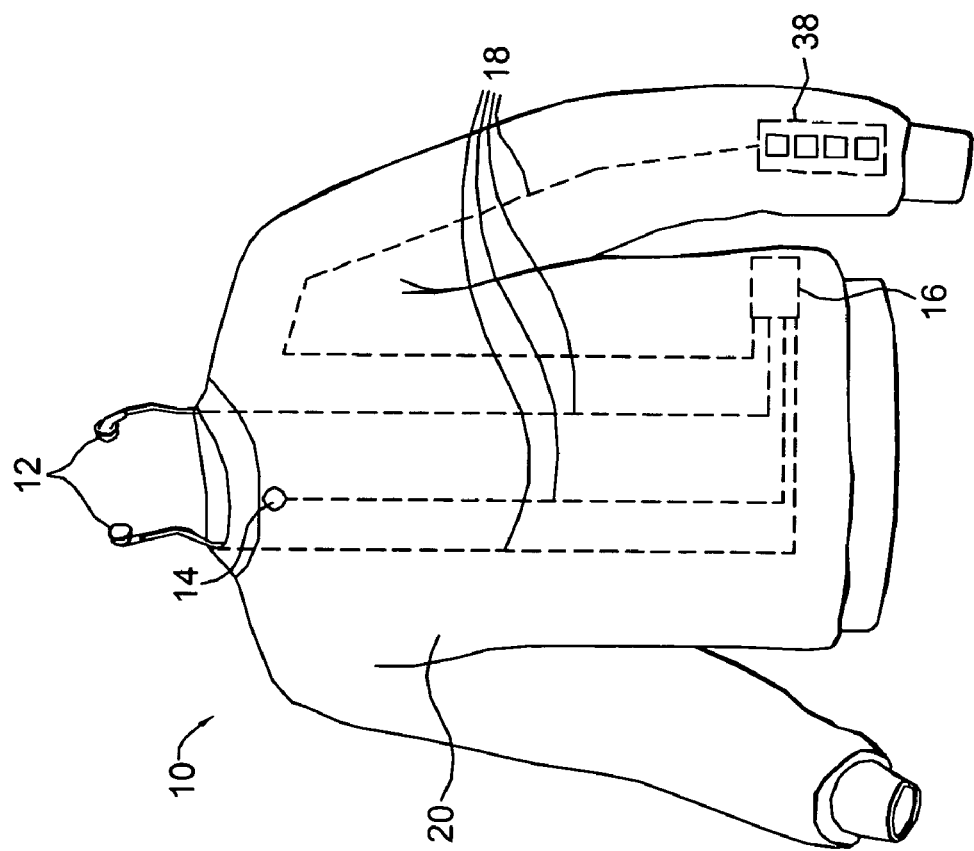

WEARABLE WIRELESS TELECOMMUNICATIONS SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention generally relates to wearable wireless telecommunications systems. More specifically, the invention relates to integrating telecommunications systems into garments using electronic textiles.

BACKGROUND

The popularity of mobile phones (e.g., cell phones, PCS phones, etc.) for wireless telecommunications has grown significantly over recent years, and their use has become pervasive in many societies. Many people depend heavily on such devices to allow them to stay in contact with coworkers, clients, friends, and family anywhere inside the coverage of a wireless telecommunications network. However, there are occasions when users may forget their mobile phones, for example, when leaving home. Additionally, mobiles phones are often subject to being lost or stolen. In any of these situations, the users may not take advantage of the wireless telecommunications capabilities of their mobile phones.

Other drawbacks of mobile phones are that they are typically not inconspicuous and often do not provide for hands-free communication. Mobile phones typically have built-in speakers and microphones, requiring users to hold the mobile phones to their heads during use. In some cases, users may purchase headsets that include an earpiece and microphone and have a wired connection to the mobile phone. However, the wire connecting a headset and mobile phone may get in the user's way or otherwise be distracting. Other headsets are available that employ short-range wireless communication (e.g., via Bluetooth) with a mobile phone. However, these wireless headsets are typically awkward and not inconspicuous. Moreover, in either case of a wired or wireless headset, the headsets add another piece of equipment that may be lost or stolen or that users may forget to bring with them.

The current state of the art could be improved if wireless telecommunications capabilities could be integrated with users' personal items in such a way that allows inconspicuous use and that are not likely to be lost, stolen, or forgotten by a user. One such alternative could be the integration of wireless telecommunications capabilities with articles of clothing, for example, using e-textiles.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to a wearable wireless telecommunications system capable of providing wireless telecommunications capabilities to a wearer. Accordingly, in one aspect, an embodiment of the present invention is directed to a wearable wireless telecommunications system. The wearable wireless system includes at least one interface device, at least one speaker, and at least one microphone. The interface device includes at least one wireless communications component for communicating with a wireless telecommunications network. The interface device also includes one or more e-textile interfaces for interfacing with one or more e-textiles. The speaker is communicatively coupled to the interface device and is capable of receiving audio signals from the interface device and converting the audio signals to sound. The microphone is also communicatively coupled to interface device and is capable of converting sound to audio signals for communication to the interface device. At least one of the speaker and the microphone is communicatively coupled with the at least one interface device via at the e-textiles.

In another aspect of the present invention, an embodiment is directed to a wearable wireless telecommunications system, including at least one interface device, at least one speaker, and at least one microphone. The interface device includes a long-range wireless telecommunications component for transmitting audio signals to a wireless telecommunications network and receiving audio signals from the wireless telecommunications network. The interface device also includes one or more e-textile interfaces for interfacing with one or more e-textiles. The interface device further includes a personal area network component for communicating via a personal area network. The speaker is communicatively coupled to the at least one interface device via the personal area network. Audio signals from the wireless telecommunications network are received by the long-range wireless telecommunications component and communicated from the interface device to the speaker via the personal area network. The speaker converts the audio signals to sound. The microphone is communicatively coupled to the interface device via the e-textiles. The microphone converts sound to audio signals and communicates the audio signals to the interface device via the e-textiles. The long-range wireless telecommunications component communicates the audio signals to the wireless telecommunications network.

In a further aspect, an embodiment of the present invention is directed to a wearable wireless telecommunications system that includes a garment, at least one interface device, at least one speaker, and at least one microphone. The garment includes one or more e-textiles. The interface device includes a long-range wireless telecommunications component for communicating with a wireless telecommunications network over a long-range wireless interface. The long-range wireless telecommunications component is capable of transmitting audio signals to the wireless telecommunications network and receiving audio signals from the wireless telecommunications network. The interface device further includes one or more e-textile interfaces for interfacing with the e-textiles. The speaker is communicatively coupled with the interface device via the e-textiles and is capable of receiving audio signals from the interface device and converting the audio signals to sound. The microphone is communicatively coupled with the interface device via the e-textiles and is capable of converting sound to audio signals for communication to the at least one interface device.

BRIEF DESCRIPTION OF THE SEVERAL VIEWS OF THE DRAWINGS

The present invention is described in detail below with reference to the attached drawing figures, which are incorporated by reference herein and wherein:

FIG. 1 is a perspective view of an exemplary wearable wireless system in accordance with an embodiment of the present invention;

FIG. 2 is a perspective view of an exemplary wearable wireless system in accordance with another embodiment of the present invention;

DETAILED DESCRIPTION

Figure 3:
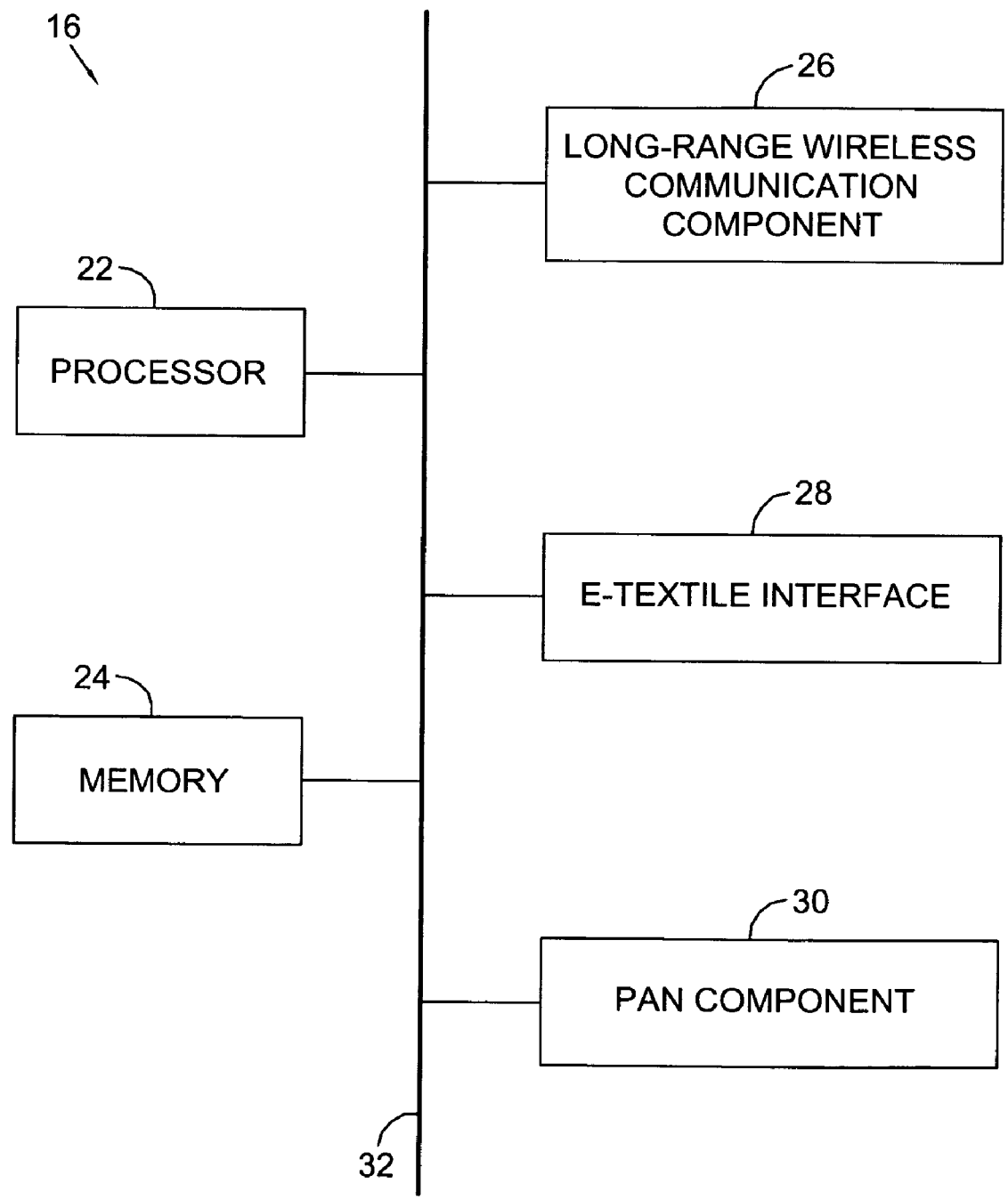
FIG. 3 is a block diagram of an exemplary interface device in accordance with an embodiment of the present invention.

Embodiments of the present invention permit, among other things, wireless telecommunications capabilities to be integrated with garments of clothing. In an embodiment, a very small form factor microphone and speakers may be integrated with a garment using e-textiles to provide signaling capabilities with an interface device providing long-range wireless telecommunications capabilities. In embodiments, audio signals may be communicated between the microphone and interface device and/or the speakers and interface device using one or more e-textiles. Additionally, audio signals may be communicated between the interface device and a wireless telecommunications network. As used herein, the term "audio signal" refers to any type of modulated signal encoded with audio and may be carried by any type of communications media (e.g., wired media and wireless media, such as radio frequency (RF) media).

Wearable wireless telecommunications systems in accordance with embodiments of the present invention provide significant advantages over current state of the art mobile phones and headsets. For example, while people may forget to bring mobile phones and/or headsets with them when they leave home, they are not likely to leave home without clothing. Additionally, articles of clothing are not likely to be lost or stolen while users are wearing them. Moreover, such garments may provide users with inconspicuous and hands-free wireless telecommunications capabilities.

Generally, e-textiles are textiles that have electrical conductive fibers and/or optical conductive fibers woven into the fabric. Traditional fibers such as cotton and polyester lack the properties necessary to carry a sufficient electrical current or an optical signal for signaling and power transfer purposes. However, a variety of specialty fibers have been developed that have the needed optical and/or electrical conductive properties. By way of example only and not limitation, these specialty textiles can be created by being doped with conductive materials and then insulated, placing flexible wiring within fabrics, or sewing pieces of conductive material upon a nonconductive textile.

As one skilled in the art will appreciate, the present invention may be embodied as, among other things: a method, system, or computer-program product. Accordingly, the present invention may take the form of a hardware embodiment, a software embodiment, or an embodiment combining software and hardware. Embodiments may include computer-program products that include computer-useable instructions embodied on one or more computer-readable media.

Computer-readable media include both volatile and non-volatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

With initial reference to FIG. 1, a wearable wireless system in accordance with an embodiment of the present invention is designated generally with the reference numeral 10. The wearable wireless system 10 provides a wearer with wireless telecommunications capabilities and generally includes one or more of each of the following components: speakers 12, a microphone 14, and an interface device 16. In various embodiments of the present invention, electrical connections 18 between at least some of these components of the wearable wireless system 10 are provided via e-textiles integrated with a garment 20, such as, for example, a shirt or coat.

The electrical connections 18 provided by e-textiles shown in FIG. 1 are illustrated in such a way as to be representative of electrical connections between components of the wearable wireless system 10. Although only single electrical connections 18 are shown between components in FIG. 1, in practice, redundant electrical connections may be provided between components for fault-tolerance purposes. For example, because garments are susceptible to wear and tear, it may be desirable to have redundant electrical connections in the event that some connections fail. Accordingly, the amount of the garment's 20 fabric that is e-textile may vary. In some embodiments, only portions of the garment 20 may be e-textiles, while in others, the garment 20 may be composed entirely of e-textiles. In further embodiments, none of the garment's 20 fabric consists of e-textiles and instead, e-textiles may be sewn to or otherwise attached to the garment 20.

The interface device 16 provides long-range wireless telecommunications capabilities to the wearable wireless system 10, for example, by transmitting and receiving radio frequency (RF) signals to and from a wireless telecommunications network. Audio signals received by the interface device 16 from the long-range wireless telecommunications network are communicated to the speakers 12. Additionally, audio signals received by the interface device 16 from the microphone 14 are transmitted to the wireless telecommunications network via the interface device 16. A block diagram of an exemplary interface device 16 is shown in FIG. 3. The exemplary interface device 16 generally includes a processor 22, memory 24, a long-range wireless communications component 26, an e-textile interface 28, and a personal area network (PAN) component 30, all of which may be communicatively linked by a system bus 32.

The processor 22 may comprise one or more processors that read data from various components and operate to coordinate various functions of the interface device 16 as described herein. The memory 24 includes computer-storage media in the form of volatile and/or nonvolatile memory. The memory 24 may be removable, nonremovable, or a combination thereof. The memory 24 serves to store data, such as program instructions and personal information.

The long-range wireless communications component 26 functions to establish and engage in communication over a long-range wireless RF interface. The long-range wireless communications component may both transmit and receive RF signals over the long-range wireless RF interface. The communication may occur in a digital format, such as CDMA, TDMA, GSM, or may occur in an analog format, such as AMPS. The long-range wireless communications component 26 may or may not be electrically connected to an antenna (not shown) for transmitting and receiving RF signals over the long-range wireless RF interface. In some cases, e-textiles within the garment may serve as an antenna.

The e-textile interface 28 may comprise one or more interfaces with e-textiles within the wearable wireless system 10. As such, in various embodiments of the present invention, the e-textile interface 28 may interface with e-textiles providing communication between the interface device 16 and the speakers 12, microphone 14, and/or other devices connected to the wearable wireless system 10 (e.g., physical user interfaces such as those described in further detail below).

In some embodiments, such as that shown in FIG. 3, the interface device 16 may also include a PAN component 30. The PAN component 30 provides short-range wireless communications between the interface device 16 and other components of the wearable wireless system 10, such as the speakers 12, for example. The PAN component 30 may communicate via Bluetooth or other standards for short-range wireless communications.

Because the interface device 16 is attached to a garment 20 that is intended to be worn, the interface device 16 is preferably designed to be flexible, small, and lightweight to reduce any distraction or discomfort to the wearer. In some embodiments, the interface device 16 may be integrated into the garment 20 in a manner in which it is not intended to be removed (e.g., sewn into the garment 20). In such embodiments, the interface device 16 may be sealed, such that the garment 20 may be washed without harming the interface device 16. In other embodiments, however, a connection may be provided in the garment 20, allowing the interface device 16 to be detachable. The connection may be specific to the textile integration required. For a rudimentary embodiment where small, flexible wires have been integrated into a fabric, or sewn onto a fabric as a single piece of cloth, the connection may comprise a female edge connector which accepts the textile and holds it into position according to the specification of which the connector was built. In an embodiment that contains solely conductive textile, the interface device 16 may be connected to the fabric with a small push pin and backing design or a minuscule alligator clip.

Figure 4:
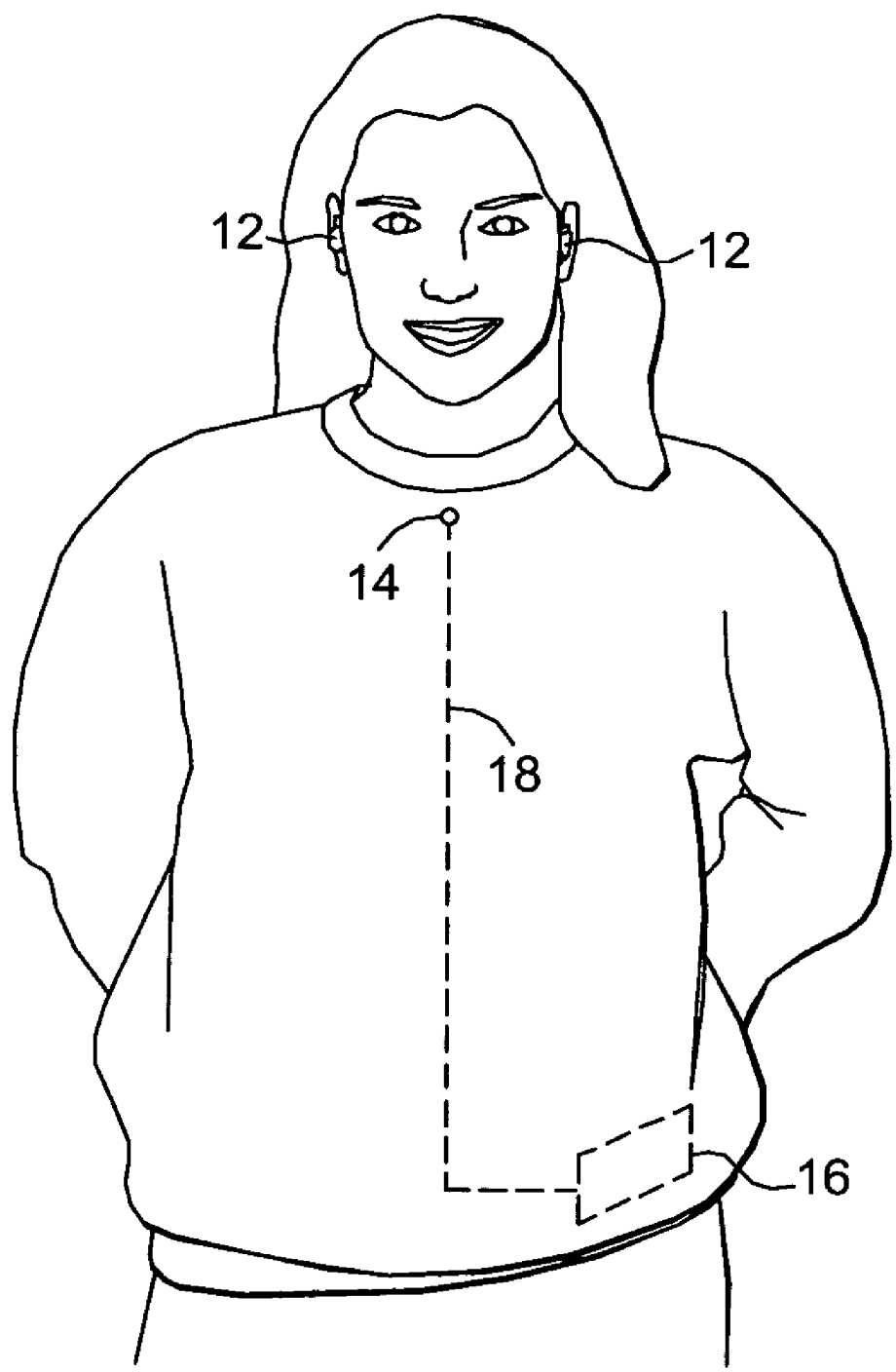
FIG. 4 is a perspective view of an exemplary wearable wireless system in accordance with a further embodiment of the present invention.

As indicated previously, audio signals received by the interface device 16 from a wireless telecommunications network may be transmitted to the speakers 12. Generally, the speakers 12 may be any type of speaker device for converting audio signals to sound. For example, the speakers 12 may be very small form factor speakers that may be placed in the wearer's ears. In some embodiments, communication between the interface device 16 and the speakers 12 may be via e-textiles, such as shown in FIG. 1 and FIG. 2. In other embodiments, communication between the interface device 16 and the speakers 12 may be via PAN communication (e.g., Bluetooth). For example, as shown in FIG. 4, each speaker 12 may be a stand-alone earbud unit that a user may simply place in his/her ear. The speakers could also be integrated into other items that a user may wear.

The wearable wireless system 10 also includes a microphone 14 that detects sound (e.g., the wearer speaking) and transmits audio signals to the interface device 16. Communication between the microphone 14 and the interface device 16 is typically via e-textiles. The microphone 14 may be a very small form factor device integrated into the garment 20. In other embodiments, a connection may be provided on the garment 20 for connecting a detachable microphone 14 to the e-textiles. Accordingly, the microphone 14 may be integrated in an object such as a tie tack, a pen, or the like that may be placed on the garment 20 and connected to the wearable wireless system 10 via e-textiles in the garment 20. The connection of the microphone 14 to the e-textiles in the garment 20 may be specific to the textile integration required. For a rudimentary embodiment where small, flexible wires have been integrated into a fabric, or sewn onto a fabric as a single piece of cloth, the connection to the microphone may comprise a female edge connector which accepts the wires and holds it into position according to the specification of which the connector was built. In an embodiment that contains solely conductive textile, the microphone 14 may be connected to the fabric with a small push pin and backing design or a minuscule alligator clip.

Each of the components (e.g., the speakers 12, microphone 14, and interface device 16) of the wearable wireless system may be powered in a variety of different manners within the scope of the present invention. In some embodiments, each of the components may be individually powered, for example, via batteries integrated with each component. In other embodiments, a single power supply may be provided to power all the components. A single power supply provides a significant advantage in that only one power supply needs to be recharged and/or replaced as necessary. For example, a stand-alone battery may be integrated with the garment 20 and e-textiles may provide electrical connections between the stand-alone battery and the components. As another example, the interface device 16 may include a battery and the other components may be powered via electrical connections 18 provided by e-textiles between the interface device 16 and the other components. In some embodiments, a stand-alone battery or battery integrated with the interface device 16 may be detachable, for recharging and replacement purposes. In further embodiments, power may be supplied from power sources such as solar power, temperature, and/or mechanical energy (e.g., generated from a wearer's movement, walking, etc.) via devices that are integrated into the wearable wireless system 10 for harnessing such power.

User interaction with and control of the wearable wireless system 10 may be provided in a number of different ways within the scope of the present invention. In some embodiments, hands-free interaction with and control of the wearable wireless system 10 may be provided by speech recognition. For example, a user may audibly provide speech commands and other data inputs that are received via the microphone 14 and transmitted as audio signals to the interface device 16. Speech recognition software may then interpret the audio signals to determine the commands and data inputs provided by the user. Additionally, the interface device 16 may include text-to-speech capabilities to provide information audibly to a user via the speakers 12.

Alternatively or in addition to speech recognition, user interaction with and control of the wearable wireless system 10 may be provided via one or more physical user interfaces. For example, in the embodiment shown in FIG. 1, an e-textile user interface 38 is provided on the garment 20: The e-textile user interface 38 may comprises an e-textile keypad responsive to touch. A user pressing down on individual elements of the e-textile user interface 38 may cause conductors to make conduct or cause an increase in capacitance of electrodes, for instance, thereby sending signals to the interface device 16 and causing controls to react. In some embodiments, other objects or pieces of clothing or jewelry, may operate as a user interface for the wearable wireless system. For example, a watch, a pen, a necklace, or a ring may serve as a user interface. In such cases, because such objects may not be physically connected to the garment 20, the objects may communicate commands and data inputs to the interface device 16 via PAN communication.

The wearable wireless system 10 may also include capabilities for establishing network presence. For example, users may have multiple garments, each of which comprises a wearable wireless system (e.g., different shirts, coats, jackets, etc.). However, users typically do not want to have multiple phone numbers (e.g., a phone number for each garment). Instead, users typically wish to have only a single phone number at which other people may call them. Accordingly, a wireless telecommunications network must determine the appropriate wearable wireless system to which calls should be routed for a user at any given time. To do so, the particular wearable wireless system to which calls should be routed must establish network presence. In some embodiments, a user may manually provide an indication to the wireless telecommunications network, for instance, via one of the user's wearable wireless systems (e.g., physical interaction with garment controls). In other embodiments, a wearable wireless system may automatically establish network presence. For example, presence may be determined by the physical connection of an interface device to a garment. As another example, e-textiles or devices connected to the wearable wireless system 10 may detect that the garment 20 is currently being worn by a user (e.g., by physiological monitoring, such as detecting body temperature, heart rate, arm movement, back bends, etc.), thereby causing the interface device 16 to automatically establish network presence.

As can be seen, embodiments of the present invention are directed to a wearable wireless system providing a wearer with telecommunication capabilities. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A wearable wireless telecommunications system comprising:
    at least two garments comprising one or more e-textiles;
    at least one interface device, the at least one interface device comprising at least one wireless communications component for communicating with a wireless telecommunications network, the at least one interface device further comprising one or more e-textile interfaces for interfacing with one or more e-textiles of either of the garments, the at least one interface device configured to determine presence received from one or more physiological monitoring components determining that one of the garments is currently being worn by a user and the at least one interface device configured to communicate a network presence indication to the wireless telecommunications network, causing the wireless telecommunications network to direct calls to the garment currently being worn by the user;
    at least one speaker communicatively coupled to the at least one interface device, the at least one speaker for receiving audio signals from the at least one interface device and converting the audio signals to sound;
    at least one microphone communicatively coupled to the at least one interface device, the at least one microphone for converting sound to audio signals for communication to the interface device;
    wherein at least one of the at least one speaker and the at least one microphone is communicatively coupled with the at least one interface device via at least one of the one or more e-textiles; and
    the one or more physiological monitoring components for automatically determining which garment is currently being worn by the user and to cause calls to be directed to the garment currently being worn by the user, wherein the at least one interface device automatically communicates the network presence indication to the wireless telecommunications network responsive to an automatic determination that the garment is currently being worn by the user.

2. The wearable wireless telecommunications system of claim 1, wherein the interface device further comprises a personal area network component for communicating with at least one of the at least one microphone and the at least one speaker via a personal area network.

3. The wearable wireless telecommunications system of claim 1, wherein the at least one microphone is communicatively coupled to the interface device via at least one of the one or more e-textiles.

4. The wearable wireless telecommunications system of claim 3, wherein the at least one speaker is communicatively coupled to the interface device via a personal area network.

5. The wearable wireless telecommunications system of claim 1, wherein the at least one speaker is communicatively coupled to the interface device via at least one of the one or more e-textiles.

6. The wearable wireless telecommunications system of claim 1, wherein the system is configured to allow hands-free user control.

7. The wearable wireless telecommunications system of claim 6, wherein the system comprises a speech recognition component for interpreting audio signals from the at least one microphone, the audio signals representing at least one of a verbal command and a verbal input from a user.

8. The wearable wireless telecommunications system of claim 6, wherein the system comprises a text-to-speech component for converting text to audio signals for communication to the at least one speaker.

9. The wearable wireless telecommunications system of claim 1, further comprising an e-textile user interface for controlling the wearable wireless telecommunications system, the e-textile user interface being communicatively coupled to the interface device via at least one of the one or more e-textiles.

10. The wearable wireless telecommunications system of claim 1, further comprising a user interface embodied in a wearable accessory item, the user interface being communicatively coupled to the interface device via a personal area network, wherein the interface device further comprises a personal area network component for communicating with the user interface via the personal area network.

11. The wearable wireless telecommunications system of claim 1, wherein each of the interface device, the at least one speaker, and the at least one microphone are powered by a common power supply.

12. The wearable wireless telecommunications system of claim 1, wherein at least one of the interface device, the at least one speaker, and the at least one microphone are electrically connected with the common power supply by at least one of the one or more e-textiles.

13. The wearable wireless telecommunications system of claim 1, wherein the wearable wireless telecommunications system is configured to determine presence by at least one of determining a physical connection of the interface device to the wearable wireless telecommunications system and determining user interface with one or more controls.

14. The wearable wireless telecommunications system of claim 1, wherein at least one of the one or more e-textiles comprises a conductive material sewn onto a textile.

15. The wearable wireless telecommunications system of claim 1, wherein at least one of the one or more e-textiles comprises a wire or conductive metal element that is embedded into a textile.

16. The wearable wireless telecommunications system of claim 1, wherein at least one of the one or more e-textiles comprises a textile that has been doped with conductive material and then insulated.

17. A wearable wireless telecommunications system comprising:
at least two garments comprising one or more e-textiles;
at least one interface device, the at least one interface device comprising a long-range wireless telecommunications component for transmitting audio signals to a wireless telecommunications network and receiving audio signals from the wireless telecommunications network, the at least one interface device further comprising one or more e-textile interfaces for interfacing with one or more e-textiles of either of the garments,
the at least one interface device further comprising a personal area network component for communicating via a personal area network, the at least one interface device configured to determine presence received from one or more physiological monitoring components determining that one of the garments is currently being worn by a user and the at least one interface configured to communicate a network presence indication to the wireless telecommunications network, causing the wireless telecommunications network to direct calls to the garment currently being worn by the user;
the one or more physiological monitoring components for automatically determining which garment is currently being worn by the user and to cause calls to be directed to the the garment currently being worn by the user, wherein the at least one interface device automatically communicates the network presence to the wireless telecommunications network responsive to an automatic determination that the garment is currently being worn by the user;
at least one speaker communicatively coupled to the at least one interface device via the personal area network, wherein audio signals from the wireless telecommunications network are received by the long-range wireless telecommunications component and communicated from the at least one interface device to the at least one speaker via the personal area network, and wherein the at least one speaker converts the audio signals to sound; and
at least one microphone communicatively coupled to the at least one interface device via at least one of the one or more e-textiles, wherein the at least one microphone converts sound to audio signals and communicates the audio signals to the at least one interface device via the at least one of the one or more e-textiles,
and wherein the at least one long-range wireless telecommunications component communicates the audio signals to the wireless telecommunications network.

18. A wearable wireless telecommunications system comprising:
at least two garments comprising one or more e-textiles;
at least one interface device comprising a long-range wireless telecommunications component for communicating with a wireless telecommunications network over a long-range wireless interface, wherein the long-range wireless telecommunications component transmits audio signals to the wireless telecommunications network and receives audio signals from the wireless telecommunications network, the at least one interface device further comprising one or more e-textile interfaces for interfacing with at least one of the one or more e-textiles, the at least one interface device configured to determine presence received from one or more physiological monitoring components determining that one of the garments is currently being worn by a user and the at least one interface device is configured to communicate a network presence indication to the wireless telecommunications network, causing the wireless telecommunications network to direct calls to the garment currently being worn by the user;

the one or more physiological monitoring components for automatically determining which garment is currently being worn by the user and to cause calls to be directed to the garment currently being worn by the user, wherein the at least one interface device automatically communicates the network presence to the wireless telecommunications network responsive to an automatic determination that the garment is currently being worn by the user;

at least one speaker communicatively coupled with the at least one interface device via at least one of the one or more e-textiles, the at least one speaker for receiving audio signals from the at least one interface device and converting the audio signals to sound; and at least one microphone communicatively coupled with the at least one interface device via at least one of the one or more e-textiles, the at least one microphone for converting sound to audio signals for communication to the at least one interface device.

\* \* \* \* \*